May 10, 1955 J. R. PIERCE 2,708,236
MICROWAVE AMPLIFIERS
Filed March 18, 1950 4 Sheets-Sheet 1
FIG. 1A
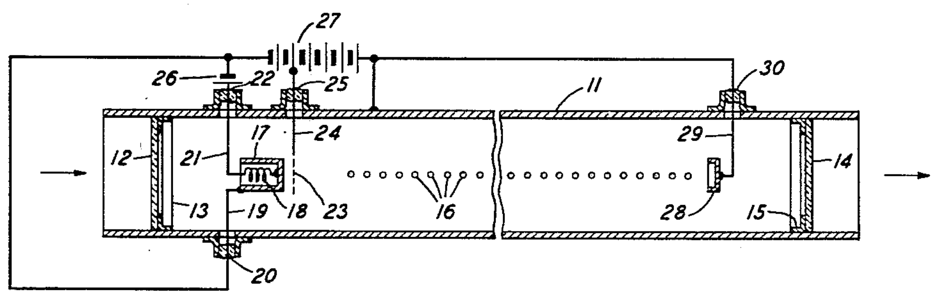
FIG. 1B
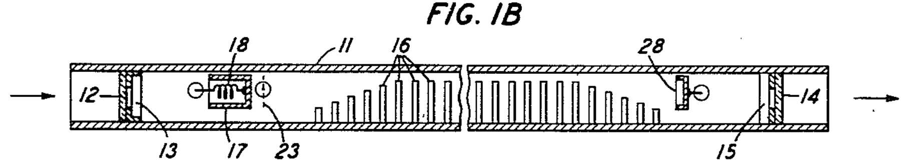
FIG. 2A
FIG. 1C
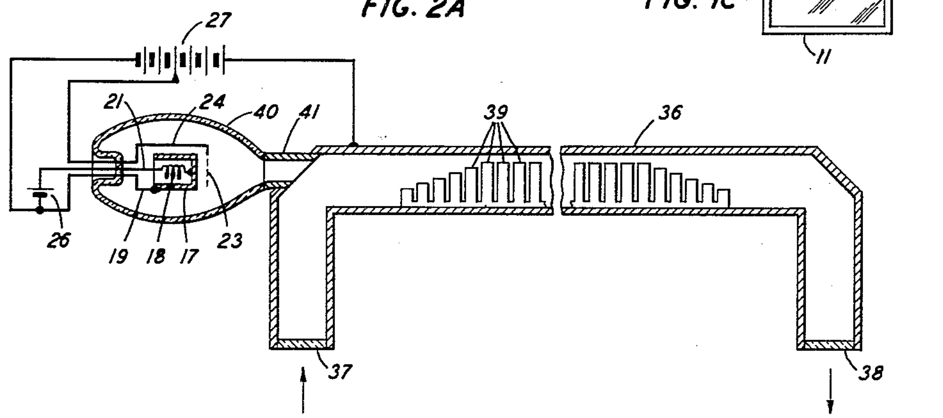
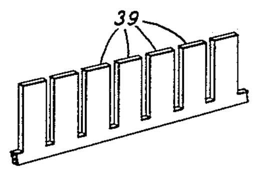
FIG. 2B
INVENTOR
J. R. PIERCE
BY R. B. Ardis
AGENT INVENTOR
J. R. PIERCE
BY R. B. Ardis
AGENT

MICROWAVE AMPLIFIERS

Filed March 18, 1950

INVENTOR
J. R. PIERCE
BY R. B. Ardis
AGENT

INVENTOR
J. R. PIERCE
BY R. B. Ardis
AGENT

United States Patent Office 2,708,236

Patented May 10, 1955

2,708,236

MICROWAVE AMPLIFIERS

John R. Pierce, Millburn, N. J., assignor to Bell Telephone Laboratories, Incorporated, New York, N. Y., a corporation of New York Application March 18, 1950, Serial No. 150,429

28 Claims. (Cl. 250—15)

This invention relates generally to amplifying devices designed for operation in the microwave region of frequency and wavelength and, more particularly, to such amplifying devices in which an electron beam is made to flow past an array of spaced resonator elements.

One object of the invention is to provide resonator structures and associated structures which will give a large gain, a large band width, or a combination of both.

A further object of the invention is to provide resonator structures which are simple and easy to construct and hence suitable for use at very short wavelengths, for which the resonator elements should be very small physically.

In microwave amplifiers in which an electron beam is directed past an array of spaced resonator elements, the resonator elements may act individually as resonators or cooperatively as a band-pass wave filter circuit which, when properly terminated, is essentially a non-resonant device. In both instances, a high gain is obtainable from interaction between the electron stream and the electromagnetic fields associated with the circuit elements. It has been found that either gain or band width or both will be greatest for a given current density in the electron stream when the electron flow penetrates as large a proportion as possible of the strongest portions of the electric field associated with the circuit elements.

In accordance with the present invention, the resonator elements are conductive bodies which have substantially negligible areas in planes transverse to the electron stream. The proportion of the area presented to the electron stream is, for example, a third or less of the total area which would be available to electron flow in the absence of the resonator elements. A relatively large proportion of the electric field associated with each resonator is thereby made permeable to electron flow, and a high gain and a wide band width are secured. By way of example, as much as a quarter or more of the total stored energy of the resonators is accessible to electrons in embodiments of the present invention.

In accordance with one species of the invention, the circuit may comprise an array of wires past which a current of electrons flows. The electron current passes through a large proportion of the electric field associated with the wires. In accordance with another species of the invention, the electrons may flow parallel to a thin sheet of metal and the circuit may comprise a series of resonator apertures punched or cut in the metal sheet. A large proportion of the electric field associated with such apertures lies outside of the plane of the metal sheet and hence much of its strongest portions can be penetrated by electron flow.

A more thorough understanding of the nature and objects of the present invention will appear from a study of the following detailed description of a number of specific embodiments. In the drawings:

Figs. 1A, 1B, and 1C show an amplifier in which the circuit includes an array of parallel wires a little less than a quarter of a wavelength long;

Figs. 2A and 2B show a form of the invention in which the circuit elements are slots cut into a thin sheet of metal;

Figure 6A:
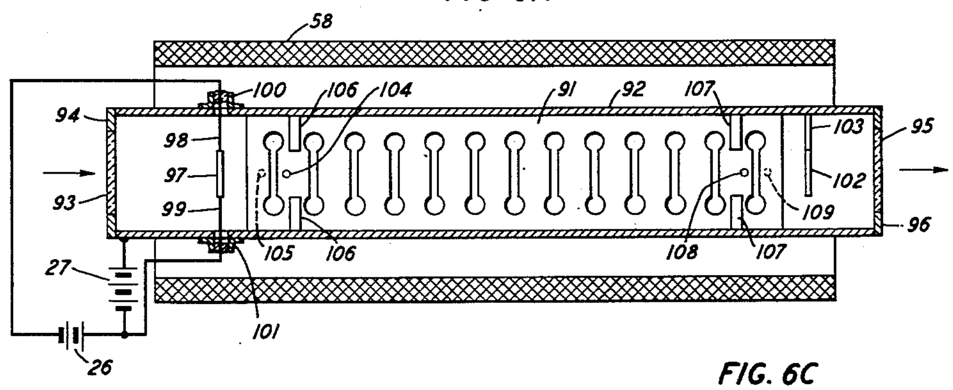
Figure 6C:
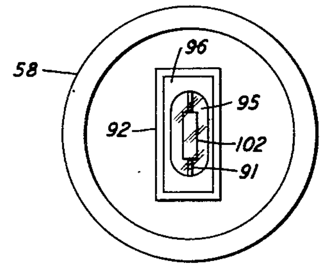
Figure 6B:
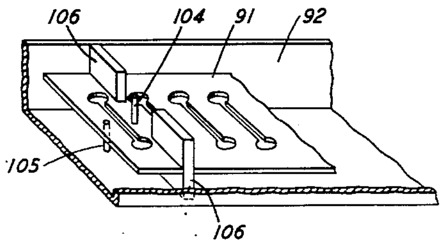
Figure 7A:
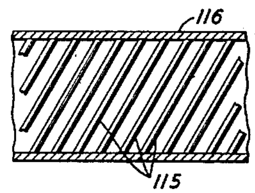
Figure 7B:
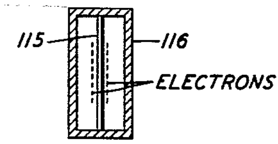
Figure 8A:
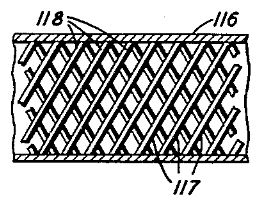
Figure 8B:
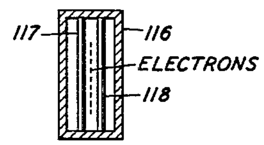
Figure 9A:
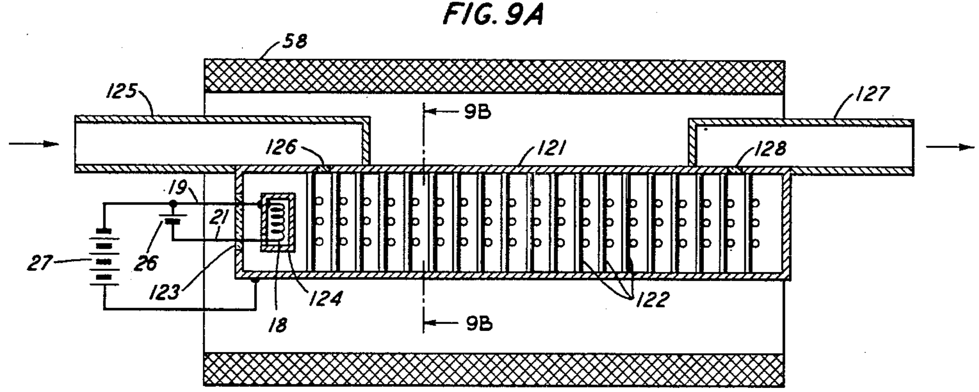
Figure 9B:
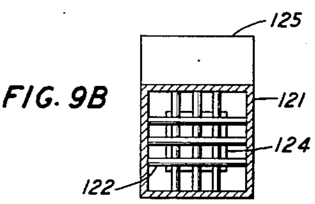

Figs. 6A, 6B, and 6C show another form of the invention in which the circuit elements are dumbbell-shaped apertures in a sheet of metal;

Figs. 7A, 7B, 8A, and 8B show various ways in which wire circuit structures can be arranged; and Figs. 9A and 9B show a form of the invention in which the wires are crossed in a reticulated pattern to form the walls of the resonators.

Referring particularly to Figs. 1A, 1B, and 1C, Fig. 1A shows a top cross-sectional view of an embodiment of the invention employing a series of parallel quarter-wave wires as a circuit. Fig. 1B shows a side cross-sectional view of the same tube, and Fig. 1C shows an end view. In Figs. 1A, 1B, and 1C, the tube elements are enclosed in an elongated rectangular metal envelope 11. Envelope 11 is evacuated and may be in the form of a hollow rectangular wave guide. At its left or input end, a vacuum-tight glass window 12 is sealed to and secured to envelope 11 by a flange 13 and, at its right or output end, a similar glass window 14 is sealed to envelope 11 by a flange 15. Both flanges 13 and 15 are secured in a vacuum-tight manner to envelope 11 and hold windows 12 and 14 at substantially right angles to the walls of envelope 11.

An array of conducting wires 16 fastened to one of the broad walls of envelope 11 forms the circuit of the amplifier. These wires 16 are a little less than a quarter of a free space signal wavelength long and are substantially parallel to each other. They extend substantially perpendicularly from the inner surface of one of the broad walls of envelope 11 and are spaced regularly for most of the length of the tube about mid-way between the side walls of envelope 11. Toward the input end of the array, the height of the wires 16 is gradually reduced in order to provide proper excitation from the input signal energy which flows in through glass window 12. Toward the output end of the array, the height of the wires 16 is likewise gradually reduced in order to efficiently transfer amplified signal energy out through glass window 14.

An electron-emissive cathode 17 is suspended within envelope 11 between the input end of the array of wires 16 and glass window 12. The electron-emissive portion of cathode 17 is faced toward the array of wires 16 to direct an electron stream past the top portions of the wires 16 where the electric fields are strongest and is in the form of a hollow metal cylinder closed at one end. A heating coil 18 is located within the hollow portion of cathode 17 and has one end electrically connected to cathode 17. Cathode 17 is supported by a lead 19 which is brought out of envelope 11 through an insulating bushing 20. The other end of heating coil 18 is supported by a lead 21 which is in turn brought out of envelope 11 through an insulating bushing 22. An accelerating grid 23 is suspended between the emitting surface of cathode 17 and the input end of the array of wires 16 by a lead 24, which passes out of envelope 11 through an insulating bushing 25.

Power from a battery 26, whose poles are connected to leads 19 and 21, heats coil 18 and hence cathode 17. The negative pole of a main beam accelerating battery 27 is connected to cathode lead 19, and an intermediate positive tap on battery 27 is connected to grid lead 24. An electron stream is thereby accelerated to the right from cathode 17. The electrons are collected by a collector electrode 28, which is mounted between the output end of the array of wires 16 and glass window 14. Collector 28 is aligned with the array of wires 16 and cathode 17 and is supported by a lead 29, which passes out of envelope 11 through an insulating bushing 30. The most positive point on battery 27 is connected to both envelope 11 and collector lead 29. The electron stream directed from cathode 17 to collector 28 may be confined by a longitudinal magnetic field produced by a solenoid or an electromagnet or by some other means not shown.

In the operation of the embodiment of the invention shown in Figs. 1A, 1B, and 1C, a radio frequency electromagnetic signal wave is supplied to the input end of envelope 11 through, for example, an input wave guide. The incoming wave has its electric field components substantially parallel to wires 16 and actuates the succession of resonators formed by the array of wires 16 after passing cathode 17. The voltage of battery 27 is adjusted to give the electrons such a velocity in passing the wires 16 that there is a strong interaction between the electric field surrounding the wires 16 and the electron flow, resulting in an amplification of the signal. The amplified signal wave is then taken off through the output end of envelope 11 past collector 28 by means of, for example, an output wave guide connected to the end of envelope 11.

In the interaction path of the tube, there is a wavelength which may be termed the electronic wavelength, which is the free space wavelength of the radio frequency signal times the ratio of tthe electron velocity to the velocity of light. Ordinarily, in the structure of Figs. 1A, 1B, and 1C, the spacing of wires 16 in the direction of the electron flow is in the vicinity of half of an electronic wavelength.

The succession of resonators formed by the array of wires 16 may be disposed in coupled relationship to act cooperatively as a band-pass wave filter circuit or may act individually. When the former is true, the tube operates as a traveling wave tube, in which the electron beam interacts with components of an electromagnetic wave which travels along the tube at approximately the electron velocity. When the latter is true, the tube operates as a multiresonator klystron, in which there is negligible coupling between the resonators except that provided by the electron beam and in which the beam interacts with fields which it sets up itself in the resonators. The particular type of operation which will take place is determined by the particular tube proportions and voltages used. By way of illustration, for resonator elements having normal loss, the signal frequency attenuation along the circuit becomes very high when the cut-off frequency of the filter circuit formed by envelope 11 and quarter-wave wires 16 is approached. Under such conditions, there is very little transmission of the signal wave along the circuit, and the device operates as a multiresonator klystron. When the attenuation is less, transmission takes place and traveling wave type operation is secured. If the resonator elements possess more than normal loss, the coupling between resonators becomes negligible at frequencies farther away from cut-off than is the case for normally lossy resonator elements. As a general rule, the less the net electric and magnetic coupling between the resonators, the wider the frequency range over which the gain producing interaction may be characterized as being the multiresonator klystron type.

For either type of operation, the embodiment of the invention shown in Figs. 1A, 1B, and 1C provides an electric field associated with the resonators, a large part of which is able to be penetrated by the electron flow. It is estimated that about two thirds of the stored energy of the resonators 16 is accessible to electrons. The resonator elements present an area in planes transverse to the electron stream that is substantially negligible or, in other words, of the order of less than a third of the total area of a corresponding cross section of the tube. The electron stream is directed through the strong portions of the field close to wires 16, and the resulting gain and band widths are considerably greater than those obtainable from devices utilizing such resonators as, for example, "pill box" resonators, in which only about a fiftieth of the stored energy can be reached by electron flow.

In the embodiment of the invention shown in Figs. 1A, 1B, and 1C, the wire elements 16 will have a "$\pi$" mode of excitation if they are somewhat shorter than a quarter of a signal wavelength, because of end capacitance or fringing fields. Such a mode of excitation gives a field pattern in which the free ends of successive wires 16 are alternately positive and negative. If the structure is to act as a band-pass filter, the "$\pi$" mode will be the upper cut-off frequency. Operation is secured at a somewhat lower frequency, at which the wires are shorter in comparison with a quarter of a wavelength than at the "$\pi$" mode frequency. If the wires 16 are acting essentially as resonant elements, gain will be at its greatest near the "$\pi$" mode frequency, decrease rapidly with frequency above it, and decrease less rapidly with frequency below it. The exact relation between the length of the wires 16 and a quarter of a wavelength depends upon wire size and spacing, and spacing from the ends of the wires 16 to the top of the wave guide 11. In general, the "$\pi$" mode will occur for wire lengths between three-sixteenths and a quarter of a wavelength.

If the tube of Figs. 1A, 1B, and 1C is to act as a traveling wave tube with the wire elements 16 forming a band-pass filter, operation with a one-half electronic wavelength spacing between centers of adjacent wires would mean operation at the filter cut-off frequency. In general, the spacing should be nine-tenths, or less, of half of an electronic wavelength. If multiresonator klystron operation is to be secured, with the wires 16 forming essentially resonant elements, spacings of half of an electronic wavelength are permissible. In fact, the spacing may even be somewhat greater than half of an electronic wavelength, such as, for example, one and two-tenths of half of an electronic wavelength.

It will be noted that the wires 16 need not necessarily be of circular cross section. While the wires shown are circular in cross section, wires in the form of narrow conducting strips will serve as well or better from the standpoint of rendering the electric field accessible to electron flow. Such strips may, for example, have their broad faces transverse to the electron stream. It is contemplated that numerous other wire shapes may also be used.

In a practical embodiment of the tube shown in Figs. 1A, 1B, and 1C, wires of circular cross section were employed. For a beam voltage of one thousand volts and a signal frequency in the 4000-megacycle range, the wires were spaced from five hundredths of an inch to one tenth of an inch from center to center, had diameters of about half the center-to-center spacing, and were from one half to three quarters of an inch long.

Figs. 2A and 2B show another embodiment of the present invention. Fig. 2A shows a side cross-sectional view of a tube using a thin sheet of metal into which quarter-wave slots have been cut as a circuit. Fig. 2B shows a detail of the circuit. The structure of Figs. 2A and 2B is similar in some respects to the structure of Figs. 1A, 1B, and 1C. The tube in Figs. 2A is, however, an elongated rectangular conducting envelope 36 which is bent at both ends so that the input and output portions of the envelope 36 are at right angles to the longitudinal portions. A glass input window 37 and a glass output window 38 are sealed to either end of envelope 36 to maintain a vacuum in the envelope 10. As in Figs. 1A, 1B, and 1C, envelope 36 may be a section of hollow rectangular wave guide.

The circuit in Fig. 2A comprises a ridge of thin metal projecting from the center of one inner face of envelope 36. Into the ridge are cut a succession of narrow slots, leaving between the slots flat conducting strips or fins 39, as is shown in more detail in Fig. 2B. The fins 39 have their wide faces parallel to the narrow side walls of envelope 36 and are a little less than a quarter of a free space signal wavelength long. For example, they may be between three sixteenths and a quarter of a wavelength long. They extend for most of the length of the straight section of envelope 36. The metal ridge is tapered at the input and output ends, with the lengths of the fins 39 gradually decreasing as either end is approached, in order to provide proper excitation of the circuit elements by the input wave at the input end and in order to excite a strong output signal at the output end.

The bends at the input and output ends of envelope 36 are provided with 45-degree corners or elbows of the type generally employed in 90-degree wave guide bends. Radio frequency signal energy passing through input window 37 from an input wave guide will thereby be applied to the succession of fins 39, and amplified signal energy appearing at the output end of the succession of fins 39 may be extracted through output window 38 by means of, for example, an input wave guide.

An electron stream is projected past top portions of the succession of fins 39 through an aperture in the 45-degree corner at the input end of envelope 36. To the left of the aperture, and aligned with the interior of envelope 36, is an electron-emissive cathode 17, which is substantially the same as cathode 17 in Figs. 1A, 1B, and 1C. A cathode heater 18 is located within cathode cylinder 17, and an accelerating grid 23 is mounted between cathode 17 and the aperture in envelope 36. A glass envelope 40 surrounds the cathode structure and is sealed to a short metal tube 41, which is, in turn, connected in a vacuum-tight manner to envelope 36.

Cathode 17 is supported by a lead 19 which extends through glass envelope 40 to the negative pole of the main beam accelerating battery 27. One end of heating coil 18 is connected to cathode 17, and the other end is supported by a lead 21 which extends out of glass envelope 40. A heater battery 26 is connected between leads 19 and 21 to supply power to coil 18. Accelerating grid 23 is supported by a lead 24 which also extends out of glass envelope 40 and is connected to an intermediate tap on battery 27. The positive pole of battery 27 is connected to envelope 36.

When cathode 17 is energized, an electron stream is directed to the right, through connecting tube 41, and through the straight portion of envelope 36, past the top portions of the fins 39, where the electric fields established by a signal are strongest. The electrons are confined in a beam by a longitudinal magnetic field produced by means not shown, and the spent electrons are collected on the bent portion at the output end of envelope 36.

When a radio frequency electromagnetic signal wave, with its electric field components substantially parallel to the narrow faces of envelope 36, is applied to envelope 36, through input window 37, the resonators formed by fins 39 are energized, and the electron stream passing the gaps between fins 39 interacts with the electric field existing there to amplify the signal wave.

In the embodiment of the invention shown in Figs. 2A and 2B, much of the strongest portions of the electric field associated with the resonators formed by fins 39 may be penetrated by the electron flow since the area presented by each resonator in planes transverse to the electron stream is very small. As has been previously indicated, improved gain and band width characteristics from the prior art are thereby provided.

In the tube shown in Figs. 2A and 2B, as explained in connection with Figs. 1A, 1B, and 1C, the resonators may act individually or cooperatively as a band-pass filter, depending, as previously discussed, on the tube proportions and voltages used. The advantages of the present invention obtain in either type of operation.

For traveling wave operation, the length of each fin 39 in the direction of electron flow should be less than half of an electronic wavelength. Otherwise, operation would be at the upper cut-off frequency of the filter. For multiresonator operation, fins 39 could be greater than half of an electronic wavelength long in the direction of electron flow. For either type of operation, the slots between fins 39 could be up to half of an electronic wavelength wide. Physically, it may be desirable to make them considerably narrower in order to make the metal fins 39 substantial enough. Thus, for traveling wave operation, the slots might be from about an eighth to a quarter of an electronic wavelength wide.

Figure 3:
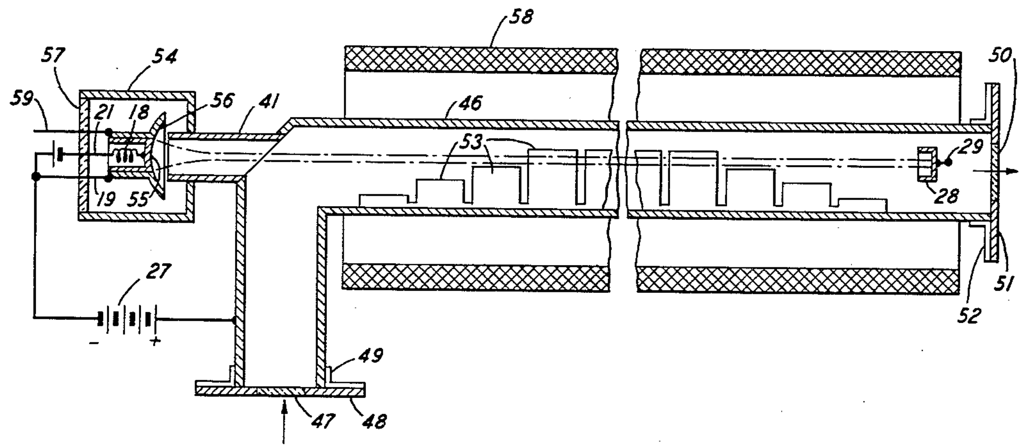
Fig. 3 shows a spatial harmonic form of the invention, in which the resonator elements are again slots but in which the slots are spaced farther apart in the direction of electron flow than those of Figs. 2A and 2B.

Fig. 3 is a side cross-sectional view of another embodiment of the invention which is, in most of its essentials, similar to the embodiment of Figs. 2A and 2B. However, the slots in Fig. 3 may be spaced farther apart than half of an electronic wavelength, thus securing what is called spatial harmonic operation. Such operation is described in application Serial No. 640,597, filed January 11, 1946, by the present inventor, and in application Serial No. 99,757, filed June 17, 1949, by S. Millman.

In Fig. 3, the interaction path is enclosed in an elongated rectangular conducting envelope 46, which may be a section of rectangular wave guide. At its left or input end, envelope 46 undergoes a right-angle bend and is provided with a 45-degree corner of the type common in the wave guide art. At the input end of envelope 46, a vacuum-tight glass or ceramic window 47 is sealed into a metal sheet 48. Metal sheet 48 covers the end of envelope 46 and is secured in a vacuum-tight manner to envelope 46 by a flange 49. The right or output end of envelope 46 is similar to the input end except that it is not bent. As at the input end, a vacuum-tight dielectric window 50 is sealed into a metal plate 51 which closes the output end of envelope 46. Metal plate 51 is secured in a vacuum-tight manner to envelope 46 by a flange 52.

Within envelope 46, a flat metal strip extends upward from the bottom midway between the two narrow sides of envelope 46 and is parallel to the sides. A succession of longitudinally spaced thin slots are cut into the strip perpendicularly to the base, leaving a succession of flat metal strips or fins 53 extending into the center of the envelope 46. Fins 53 are each a little less than a quarter of a free space signal wavelength high, and each extends in the direction of the electron stream more than half of an electronic wavelength. In typical cases, the slots between fins 53 are from three-sixteenths to a quarter of a signal wavelength deep. At either end of the array of fins 53, the array is matched or coupled to the respective input and output portions of envelope 46 by several fins 53 which are of decreasing height as the end of the array is approached.

An electron gun is built into a subsidiary metal envelope 54, which is fastened to envelope 46 by a short tube 41. Tube 41 is aligned with the array of fins or strips 53 and fits into an opening in the 45-degree corner at the input end of envelope 46. A portion of connecting tube 41 extends to the left into subsidiary envelope 54 and forms an accelerating electrode which draws electrons from a thermionic cathode 55.

Cathode 55 is in the form of a hollow metal cylinder which is closed at its right end and which is aligned with connecting tube 41. The right face of cathode cylinder 55 is a concave electron-emissive surface. A beam-forming electrode 56 is attached to cathode cylinder 55 and serves to focus the electrons along converging paths. Electrode 56 surrounds the outer surface of cathode cylinder 55 and has an outward extending flange which is flush with the concave face of cathode 55.

Heat is supplied to cathode 55 by a coil heater 18 which is within its hollow portion and has one end connected to cathode 55. Cathode 55 and focusing electrode 56 are supported by a lead 19 which extends through a glass seal 57 in the left end of gun housing envelope 54. A second lead 59 which extends through glass seal 57, may also be used to support cathode 55 and electrode 56. The free end of heater 18 is supported by a lead 21 which extends through glass seal 57 and is connected to the negative pole of a heater battery 26, the positive pole of which is connected to cathode lead 19. A main battery 27 is connected between cathode lead 19 and envelope 46, with its negative side connected to cathode lead 19.

At the output end of envelope 46, an electron collector 28 is mounted between the end of the array of conducting strips 53 and output window 50. Collector 28 is held in place by a wire lead 29 which is attached to one of the side walls of envelope 46.

When cathode 55 is heated, a beam of electrons is projected through envelope 46 past the succession of fins 53. The electron beam is confined in its travel through the tube by the magnetic field produced by a solenoid 58 which surrounds envelope 46 over the length of the interaction path. Solenoid 58, it might be noted, may be employed in connection with any of the embodiments of the invention for which no focusing means is shown. A special feature of the electron flow in this embodiment of the invention is that the gun is designed so that the electron paths in the region near the cathode lie along the magnetic lines of force produced by solenoid 58. Thus, the lines of force serve to pull the electron stream together into a narrow beam as they converge in approaching solenoid 58.

In the operation of the tube shown in Fig. 3, a radio frequency input signal wave of the normal mode passing through input window 47 from an input wave guide excites electric fields in the resonators formed by fins 53 which interact with the electrons in such a manner that stronger and stronger fields are produced in resonators farther along the stream. The strong fields in the resonant slots near the output end excite a strong output signal which passes through window 50 to an output wave guide to form the amplified output of the tube.

The resonators formed by the slots between fins 53 may be more than half of an electronic wavelength apart in the direction of electron flow in order to achieve spatial harmonic operation, such as is discussed in the above-mentioned applications of the present inventor and S. Millman, respectively. In fact, the slots may be several electronic wavelengths or more apart if it is so desired.

In Fig. 3, the resonant structures have dimensions in at least one direction transverse to the electron stream which are substantially negligible. Therefore, the area presented to the stream is very small, that is, of the order of third or less of the area of a corresponding cross section of envelope 46, and most of the strong portions of electric fields associated with the resonators can be reached by electrons. The gain producing interaction is correspondingly high in this embodiment of the invention, and maximum gain and band width are secured.

As with the previously described embodiments of the invention, that shown in Fig. 3 may operate either as a traveling wave tube or as a multiresonator klystron. The former type of operation is obtained when the resonators are disposed in a coupled relationship so that they and envelope 46 act cooperatively as a band-pass filter circuit. The latter condition obtains when the resonators are not coupled appreciably except by the electron stream. The particular type of operation depends on the relative tube dimensions and voltages, as has previously been discussed.

Figure 4A:
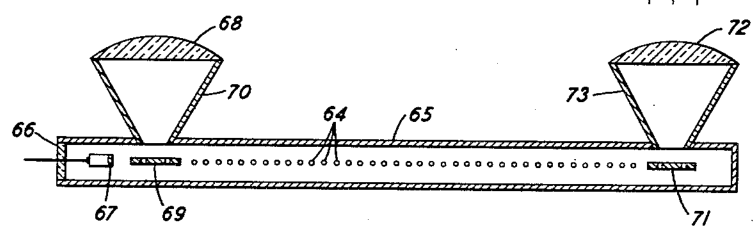
Figs. 4A and 4B show a form of the invention in which the circuit elements are parallel wires secured to a conductor at both ends and are a half wavelength or a little less than a half wavelength long.
Figure 4B:
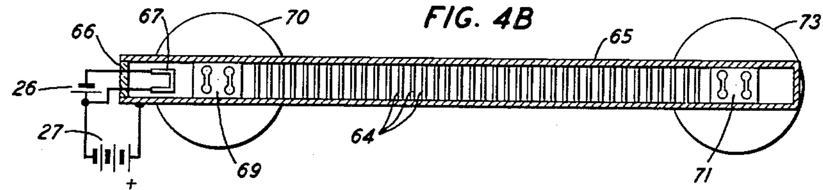

Figs. 4A and 4B illustrate an embodiment of the invention which is particularly suitable for use at very short wavelengths. Fig. 4A shows a top cross section of the tube, while Fig. 4B shows a side cross section. The circuit is in some respects similar to that of the tube described in connection with Figs. 1A, 1B, and 1C. In Figs. 4A and 4B, the circuit comprises a number of parallel conducting wires 64 secured at each end to a vacuum envelope 65.

Envelope 65 is an elongated section of hollow wave guide which is closed at its right or output end and which may be, for example, either rectangular or circular. Within envelope 65, a succession of conducting wires 64, each a little less than half of a free space signal wavelength long, extend vertically between the top and bottom of envelope 65. Wires 64 are regularly spaced along the length of envelope 65 and are substantially parallel with each other. The distance between wires 64 in the direction of electron flow is about half of an electronic wavelength.

In practical tubes, wires 64 are from about three-eighths to half of a signal wavelength long. Shorter wires give less gain than longer wires, but give a broader band width. In other words, the shorter the wires, the less rapidly the gain varies with frequency. The wires 64 may be spaced either a little more or a little less than half of an electronic wavelength apart. The actual spacing must generally be a compromise between two factors. As the spacing between wires is made very small, electrical properties become more favorable but, since the wires 64 become extremely fine, the mechanical properties become less favorable. If the spacing becomes much greater than half of an electronic wavelength, the electrical properties of the circuit become unfavorable.

The left or input end of envelope 65 is closed by a glass seal 66. An electron-emissive filament 67 is suspended between glass seal 66 and the input end of the array of wires 64 by a pair of leads which pass through glass seal 66 and are connected across a heating battery 26. One side of filament 67 is connected to the negative pole of a main beam accelerating battery 27, and the positive pole of battery 27 is connected to envelope 65 to hold it positive with respect to filament 67.

When activated, filament 67 emits a stream of electrons which is confined by a longitudinal magnetic field produced by means not shown. The beam is thereby directed past the array of wires 64 through envelope 65.

In order to excite the electron stream emitted from filament 67, an incident beam of microwaves is focused by a glass, ceramic, or other dielectric lens 68 on one or more resonant slots which are cut in a thin sheet of metal 69, which is coplanar with the wires 64. In the tube shown in Figs. 4A and 4B, two dumbbell-shaped resonant slots are used, and sheet 69 is located between the input end of the array of wires 64 and filament 67. An aperture in the side wall of envelope 65 is aligned with sheet 69, and a conical tubular member 70 is connected between envelope 65 and lens 68.

After the electron stream has traveled to the output end of the array of wires 64 and has acquired a strong amplified signal, it passes one or more resonant output slots in a thin sheet of metal 71 which is coplanar with wires 64 and is situated between the output end of the array of wires 64 and the closed end of envelope 65. In the tube shown, the resonant slots are dumbbell-shaped, as are those in sheet 69. The electron stream excites a strong signal in these resonant slots, and the signal is radiated and is focused by an output lens 72 to form an output beam of amplified microwave power. The signal is radiated through an aperture in the side wall of envelope opposite metal sheet 71, and lens 72 is aligned with the aperture and connected to envelope 65 in a vacuum-tight manner by a hollow conical member 73. Lens 72 may, if desired, be on the opposite side of envelope 65 from lens 68.

The end resonators shown are different from the ones formed by the succession of wires 64 because the latter do not radiate. The dielectric lens input and output circuits may, it will be noted, be employed with other embodiments of the invention when very short wavelengths are used. As alternative arrangements to that shown, dielectric lenses 68 and 72 may be replaced by input wave guides or horn antennas.

In the operation of the amplifier, the potential of battery 27 is adjusted to give the electrons such a velocity that they will strongly couple with the input and output resonant slots and such that they will strongly interact with the fields established in the resonators formed by wires 64 to give a large over-all amplification. Since at least one dimension of the wires 64 is substantially negligible in at least one direction transverse to the direction of electron flow, the total area presented to the stream is substantially negligible and a large proportion of the electric fields is permeable to electron flow. Gain and band width are, in accordance with the present invention, thereby maximized.

The amplifier shown in Figs. 4A and 4B will, at all times, operate as a multiresonator klystron, there being substantially no coupling between the parallel half-wave wires except that afforded by the electron stream. The stream is modulated or bunched as it passes the input resonators and it actuates each of the resonators formed by wires 64 as it passes them. Interaction between the stream and the electric fields of the resonators and amplification of the signal occurs.

Figure 5:
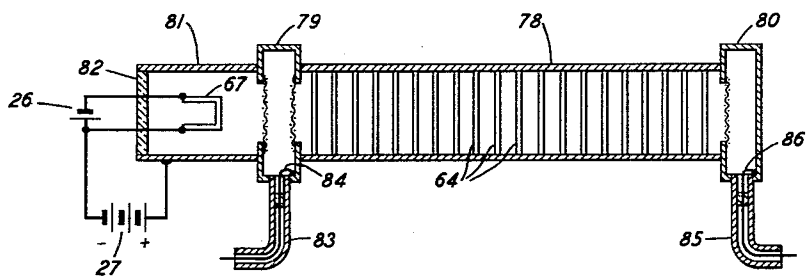
Fig. 5 shows another form of the invention in which the circuit elements are parallel wires.

Fig. 5 shows another embodiment of the invention which uses a succession of half-wavelength conducting wires 64. A side cross-sectional view of the tube is shown. In Fig. 5, as in Figs. 4A and 4B, wires 64 are each a little less than half of a free space signal wavelength long and are regularly spaced about half of an electronic wavelength apart in a common plane and parallel to each other. They are connected at each end to opposite walls of an elongated evacuated conducting envelope 78 which may, for example, be either a circular or a rectangular wave guide. Wires 64 are parallel to and may be substantially half-way between the sides of envelope 78 and extend for most of its length.

An input resonant cavity 79 closes the left or input end of envelope 78 and is in the form of a flat pillbox of circular cross section. The two side walls of resonator 79 are grids which permit the passage of electrons. An output resonant cavity 80 closes the right or output end of envelope 78 and is the same as resonator 79 except that only the side wall toward the interior of envelope 78 is in the form of a grid. To the left of resonator 79 is a filament 67 which is housed in an auxiliary envelope 81. Envelope 81 is, in effect, an extension of envelope 78 and is of substantially the same cross section. Envelope 81 is located to the left of resonator 79 and is electrically connected to envelope 78 thereby. The left end of auxiliary envelope 81 is closed by a glass seal 82 and filament 67 is supported by a pair of leads extending out through glass seal 82. These leads are connected across a heater battery 26, which thereby supplies power to filament 67. A main battery holds envelopes 81 and 78 highly positive with respect to filament 67 and is connected between envelope 81 and one side of filament 67.

The electrons which emanate from filament 67 when it is heated are confined in a beam by a longitudinal magnetic field produced by means not shown. The electrons pass resonator 79 through the grids which form portions of the cavity walls. An input signal is applied to resonator through a coaxial line 83 which is coupled into the cavity at its lowermost portion by means of a coupling loop 84. The electron stream is modulated by the input signal and then interacts with the fields associated with the resonators formed by wires 64 so as to produce a signal on the electron stream which grows in amplitude as it travels along. The electron stream bearing this amplified signal passes through the grid forming the left wall of output resonator 80 and excites a large microwave field in resonator 80. A coaxial line 85 is coupled to the lowermost portion of cavity resonator 80 by a coupling loop 86 and amplified power may be withdrawn from the system.

The wires 64 in Fig. 5 possess substantially the same virtues as do those of Figs. 4A and 4B. In accordance with the invention, they present only a substantially negligible area (that is, of the order of less than a third of the area of a corresponding cross section of envelope 78) to the electron stream and electrons are permitted to penetrate a large proportion of the strong portions of the electric field. Gain and band width are therefore at a maximum. As with the amplifier shown in Figs. 4A and 4B, that shown in Fig. 5 operates as a multiresonator klystron.

Still another embodiment of the invention is illustrated in Figs. 6A, 6B, and 6C. Fig. 6A is a side cross section of the tube, Fig. 6B shows some structural details, and Fig. 6C is an end view of the tube. In Figs. 6A, 6B, and 6C, the circuit is a thin sheet of metal 91 into which resonant dumbbell-shaped apertures have been cut. Sheet 91 is supported in a vacuum conducting envelope 92, which may be in the form of a hollow rectangular wave guide. Sheet 91 extends for most of the length of envelope 92 and extends between the top and bottom of envelope 92 midway between and parallel to the sides, which constitute the broad surfaces of the guide. The resonant apertures in sheet 91 are spaced along the length of envelope 92. The distance between the opposite edges of each resonant aperture is half of an electronic wavelength or less and the resonant apertures may be any convenient distance apart. The closer together the resonant apertures are, the more can be included in a tube of given length. Generally speaking, available gain will increase in relation to the number of resonators employed. It will be noted that there is an optimum distance between the opposite edges of each resonant aperture which is between a quarter and a half of an electronic wavelength and which gives maximum interaction for a given amount of stored energy.

The left or input end of envelope 92 is closed by a vacuum tight dielectric window 93, which is sealed to a metal sheet 94. Metal sheet 94 is, in turn, sealed to the end of envelope 92. The right or output end of envelope 92 is similarly closed by a window 95 which is sealed to a metal sheet 96.

An electron stream is directed through envelope 92 past the dumbbell-shaped apertures in resonator sheet 91 from a filament 97. Filament 97 is aligned with resonator sheet 91 and is supported between the input end of resonator sheet 91 and input window 93 by a pair of leads 98 and 99 which are connected to its ends. Leads 98 and 99 are brought out of envelope 92 through insulating bushings 100 and 101 which are located in the top and bottom walls of envelope 92, respectively. A heater battery 26 is connected between filament leads 98 and 99 and a main beam accelerating battery 27 is connected between filament lead 99 and envelope 92. Envelope 92 is thereby held at a positive potential with respect to filament 97.

The electrons emitted from filament 97 are confined by the field of a solenoid 58 so as to pass in a thin sheet on both sides of resonator sheet 91. Solenoid 58 surrounds envelope 92 over most of its length and provides a strong longitudinal magnetic field. The electrons are collected on a collector electrode 102 which is suspended by a rod 103 between the output end of resonator sheet 91 and output window 95. Collector 102 is aligned with resonator sheet 91 and rod 103 is attached to the top of envelope 92.

A radio frequency electromagnetic signal wave enters envelope 92 from an input wave guide through input window 93 with its electric field components normal to resonator sheet 91 and excites the first resonant aperture in resonator sheet 91 by coupling to a pair of small conducting posts 104 and 105. Posts 104 and 105 are attached to opposite sides of resonator sheet 91 and extend normally in opposite directions from sheet 91. One post 104 is located to the right of the first resonant aperture, while the other post 105 is located to the left. Since filament 97 is parallel to resonator sheet 91, it does not interfere to any great extent with the magnetic field components of the incoming wave. An iris or baffle 106 extends across envelope 92 between the first and second resonant apertures and prevents the electromagnetic input wave from passing farther into envelope 92 in the absence of electron flow. While baffle 106 extends all the way between the sides of envelope 92, it extends only part way down from the top and part way up from the bottom, thereby permitting the electron stream to pass. The largest dimensions of the aperture in baffle 106 are small in comparison with half of a free space signal wavelength and the baffle itself is of comparatively thick material. Details of the input end of resonator sheet 91, including coupling posts 104 and 105 and baffle 106 are shown in Fig. 6B.

The field of the first resonant aperture modulates or bunches the electron stream as it passes. The electron stream passes the other apertures and interacts with the fields associated with them so as to result in further modulation or bunching of the electron stream. Finally, the electron stream with its greatly increased modulation or bunching passes a baffle 107 at the output end of resonator sheet 92 and a pair of coupling posts 108 and 109 before it is collected on collector electrode 102.

The output end of resonant sheet 91 is substantially the same as the input end. Baffle 107 corresponds to baffle 106 and is located between the final two resonant apertures. Coupling post 108 corresponds to post 104 and is located to the left of the last aperture and on the same side of resonator sheet 91 as post 104. Coupling post 109 corresponds to post 105 and is on the opposite side of resonator sheet 91 from post 108 and located to the right of the final dumbbell-shaped aperture.

The modulated electron stream excites a strong signal in the final aperture and the signal is coupled to the output portion of envelope 92 by coupling posts 108 and 109. The output signal then passes out of envelope 92 through the dielectric output window 95 to an output wave guide.

In this embodiment of the invention, as in those previously described, the resonators formed in resonator sheet 91 present a small area to the electron stream. Much of the strongest portions of the electric fields associated with the resonant apertures can be reached by electron flow and gain and band width are maximized. In the respect that the circuit is formed in a thin sheet of metal, the embodiment of the invention shown in Figs. 6A, 6B, and 6C is similar to those shown in Figs. 2A and 2B and in Fig. 3.

The amplifier shown in Figs. 6A, 6B and 6C operates as a multiresonator klystron. In the absence of an electron stream, none of the resonant apertures but the input one are energized, since baffle 106 effectively blocks the incoming wave. When an electron stream is present, the stream is strongly bunched by the field associated with the input aperture. The bunched or modulated stream then excites succeeding apertures successively and amplification takes place.

Figs. 7A and 7B and Figs. 8A and 8B show still further embodiments of the present invention. Figs. 7A and 8A show side cross sections of circuits which are made up of half-wavelength conducting wires, and Figs. 7B and 8B show end sections of the respective circuits.

In Figs. 7A and 7B, an array of wires 115 are slanted with respect to the longitudinal dimension of the envelope 116 and the direction of electron flow. The wires 115 are coplanar and are equidistant from the two sides of envelope 116, which is shown in the form of a section of hollow wave guide which may, for example, be either rectangular or circular in cross section. Each wire 115 is in the vicinity of half a free space signal wavelength long and is secured to both the top and the bottom of envelope 116. The top of each wire 115 is somewhat forward, in the direction of electron flow, of the bottom of each wire 115. While there is substantially no coupling, in the absence of an electron stream, between parallel vertical half-wave wires, the slanting tends to introduce coupling and produce filter-like properties. Traveling wave type gain can thereby be secured from a structure made up of a succession of half-wave wires.

In Figs. 8A and 8B, two sets of wires 117 and 118 are slanted in opposite directions with respect to the longitudinal direction of the envelope 116 and with respect to the electron flow. The wires 117 and the wires 118 are in separate parallel planes. Wires 117 and 118 are in respective parallel planes and are in the vicinity of half a signal wavelength long. Each wire 117 and 118 is secured to both the top and the bottom of envelope 116. The top of each wire 117 is somewhat forward, in the direction of electron flow, of the bottom of each wire 117, while the top of each wire 118 is to the rear of the bottom of each wire 118. Mutual coupling exists between wires 117 and 118 and is controlled by the amount of slant. Traveling wave type gain can thereby be secured. The electron stream is projected through the space between the respective arrays of wires 117 and 118.

The slanted wire circuits of Figs. 7A and 7B and Figs. 8A and 8B may be employed to advantage in tubes shown in Figs. 4A and 4B and Fig. 5. The mode of operation of the tubes so modified would be that of a traveling wave tube rather than that of a multiresonator klystron because of the filter-like properties of the circuit.

In the embodiments of the invention shown in Figs. 7A and 7B and Figs. 8A and 8B, the resonators formed by the various wires present a relatively small area to the electron stream. As with the previously described embodiments, much of the strongest portions of the fields of the resonators can thereby be penetrated by electrons and gain and band width are at a maximum.

Still another embodiment of the present invention is shown in Figs. 9A and 9B. Fig. 9A is a side cross section of a tube in which the circuit is made up of a succession of resonators whose walls are grids of fine wire, while Fig. 9B is a transverse cross section of the tube taken along the line 9B—9B.

The interaction path of the amplifying device shown is enclosed in a vacuum-tight metallic envelope 121 which may be, for example, in the form of either a rectangular or a circular wave guide. The interior of envelope 121 is partitioned into a series of resonators by a number of wire mesh grids 122. Grids 122 are spaced regularly half of an electronic wavelength or less apart throughout most of the length of envelope 121 and extend perpendicularly from the inner surfaces of envelope 121. Typically, grids 122 may be from a quarter to three-eighths of an electronic wavelength apart, since the filter formed by grids 122 will cut off for a one-half wavelength phase between grids. In the grids 122 themselves, many very fine wires would be best electrically, while a few coarse ones would be best from the mechanical standpoint. As an example, the wires in each grid 122 could be about one electronic wavelength apart. For a beam accelerating voltage of 1,000 volts, this would be about one-sixteenth of a free space wavelength. Since each grid 122 would be about seven-tenths of a free space wavelength on a side, there would be about eleven wires across each grid 122, each fine enough to give a total opening of from fifty to ninety per cent of the grid area. At its right or output end, envelope 121 is closed and spent electrons are collected on the closed end. A glass seal 123 closes the left or input end of envelope 121.

A thermionic cathode 124 is suspended between the first grid 122 and glass seal 123 by a lead 19, which passes through glass seal 123. Cathode 124 has an electron-emissive surface which faces to the right and which is located about equidistantly from the four walls of envelope 121. The interior of cathode 124 is hollow and accommodates a coiled heater 18, one end of which is connected to cathode 124. The other end of heater 18 is connected to a lead 21 which passes through an aperture in the rear of cathode 124 and through glass seal 123. Power is supplied to heater 18 by a battery 26, which is connected between cathode lead 19 and heater lead 21. Cathode lead 19 is also connected to the negative pole of a beam accelerating battery 27, the positive pole of which is connected directly to envelope 121.

An input wave guide 125 which is closed at one end is attached to the top of the input end of envelope 121. Wave guide 125 is open at the bottom from its closed end to the left end of envelope 121 and fits snugly to envelope 121 over that area, extending with its length longitudinally of envelope 121. Some distance between zero and a quarter of a wavelength from the closed end of wave guide 125 is an iris or aperture in the top of envelope 121 which is closed by a vacuum-tight glass or ceramic window 126. The aperture in the top of envelope 121 is located midway between the sides of envelope 121 and is between the first and second wire grid 122.

An output wave guide 127 is similar to input guide 125 and is coupled to the right or output end of envelope 121 in the same manner as input guide is coupled to the input end. An aperture or iris between the last two grids 122 in envelope 121 is closed by a window 128 which corresponds to window 126.

When the cathode 124 is heated, a stream of electrons is emitted to the right. The first grid 122, being at the same direct-current potential as envelope 121, serves as an accelerating grid for the electrons. The stream is confined by a longitudinal magnetic field which is produced by a solenoid 58. Solenoid 58 surrounds envelope 121 over most of its length and is provided with current from an appropriate source. The electron stream travels to the right through wire grids 122 until it is collected by the far end of envelope 121.

A radio frequency signal wave carried by input wave guide 125 is coupled through window 126 to the resonator formed by the first two grids 122, exciting it. As the electron beam traverses successive resonators, it interacts with their respective electric fields to amplify the signal wave so that a greatly amplified signal appears in the resonator formed by the final two grids 122. Depending upon the degree of coupling between adjacent resonators in the absence of the electron stream and the amount of high frequency loss produced by the resonators, the tube may operate either as a multiresonator klystron or as a traveling wave tube.

In accordance with the invention, grids 122 present a small frontal area to the electron stream. The strongest portions of the fields associated with the circuit are therefore able to be permeated with electrons and gain and band width are both at a maximum.

In all of the embodiments of the present invention which have been described, the circuit has the virtue of being simple and relatively rugged. The circuit elements may, therefore, be made very small physically without introducing undue production or other mechanical difficulties. They are also relatively inexpensive to produce because of their inherent simplicity. Amplifying devices embodying the present invention are therefore particularly suitable for inexpensive but highly effective high frequency operation.

In the traveling wave tube embodiments of the present invention, it is often desirable to add high frequency loss or attenuation to the circuit to prevent instability. It is often very difficult to secure accurate impedance matches between the signal input and output circuits and the wave filter circuit over the entire frequency band in which the tube operates. Components of the radio frequency signal wave tend to be reflected back toward the input after reaching the output circuit. If such reflected components are permitted to return to the input and be reflected again in the direction of electron flow, they will be amplified and the tube will tend to oscillate. If sufficient radio frequency loss or attenuation is included in the wave filter circuit, the reflected components will be absorbed before reaching the input and stable operation will be secured.

It is found that stability is obtained if the total loss or attenuation is comparable in magnitude to the net gain of the tube. By way of example, loss may be inserted in the filter circuits of the travel wave tube embodiments of the present invention by plating the wires or fins with iron, by depositing carbon between the resonators, or by inserting ceramic material between the resonators. It is also found that power output and efficiency are greatest if the circuit attenuation is kept as low as possible for at least a minimum distance from the input circuit in the direction of electron flow. The electron stream is thereby permitted to become density modulated or bunched before the electromagnetic signal wave is attenuated appreciably.

The minimum distance from the signal input circuit to the beginning of any substantial high frequency loss or attenuation has been found to correspond to approximately $$CN = .2 \qquad (1)$$

where C is a parameter representing gain per unit length and N is circuit length in electronic wavelengths.

C is given by the relation $$C^3 = \frac{E^2}{\beta^2 P}\frac{I_0}{8V_0} \qquad (2)$$

where $\beta$ is a phase constant, E is the electric field acting on the beam in the direction of propagation, $I_0$ is the direct beam current in amperes, P is the transmitted power at any point in watts, and $V_0$ is the direct beam voltage in volts. $\beta$ is given by the relation $$\beta = \frac{\omega}{u_0} \qquad (3)$$

where $\omega$ is the radian signal frequency and $u_0$ is the direct-current beam velocity. It is to be noted that C is determined by the characteristics of the particular tube and that N designates the minimum distance from the signal input circuit at which substantial attenuation should be applied.

In general, the high frequency attenuation or loss employed may be lumped at an intermediate point along the circuit beyond the minimum distance or may be distributed substantially uniformly along the circuit, beginning at a point just beyond the minimum distance from the signal input circuit.

It is to be understood that the above-described arrangements are illustrative of the principles of the invention. Numerous other arrangements may be devised by those skilled in the art without departing from the spirit and scope of the invention.

What is claimed is:

1. An amplifying space discharge device which comprises means defining a path of travel for electrons, an electron gun positioned at one end of said path to direct an electron stream along it, a succession of resonators positioned along said path, each of said resonators being a conductive body and having, relative to the cross-section of the electron stream, a substantially negligible area perpendicular to the electron stream, means positioned at one end of said path to supply a signal wave which is to be amplified to the device, and means positioned at the other end of said path to withdraw amplified signal energy from the device.

2. An amplifying space discharge device which comprises an elongated hollow wave guide, an electron-emissive cathode positioned at one end of said wave guide to direct an electron stream through said guide, a succession of resonators positioned along the path of the electron stream within said wave guide, each of said resonators being a conductive body and having, relative to the cross-section of said wave guide, a substantially negligible area perpendicular to the electron stream, means positioned at the cathode end of said wave guide to supply a signal wave which is to be amplified to said guide, and means positioned at the other end of said wave guide to withdraw amplified signal energy from said guide.

3. An amplifying space discharge device which comprises means defining a path of travel for electrons, an electron gun positioned at one end of said path to direct an electron stream along it, a succession of resonators positioned along said path adjacent to the electron stream, each of said resonators being a conductive body and having, relative to the cross-section of the electron stream, substantially negligible extent in at least one direction perpendicular to the electron stream, means located at one end of said path to supply signal energy to the device, and means located at the other end of said path to withdraw amplified signal energy from the device.

4. A microwave amplifying device which comprises an elongated hollow wave guide, an electron-emissive cathode positioned at one end of said wave guide to direct an electron stream through said guide, a succession of resonators positioned along the interior of said wave guide adjacent to the path of the electron stream, each of said resonators being a conductive body and having, relative to the cross-section of said wave guide, a substantially negligible extent in at least one direction perpendicular to the electron stream, means located at the cathode end of said wave guide to supply signal energy to said wave guide, and means located at the other end of said wave guide to withdraw amplified signal energy from said guide.

5. A wave amplifying device which comprises means defining a path of travel for electrons, electrode means positioned at one end of said path to direct a stream of electrons along it, a succession of resonators positioned along the length of said path consisting substantially of conducting material confined substantially to a single plane extending lengthwise along said path, coupling means positioned at one end of said path to supply a signal wave which is to be amplified to the device, and coupling means positioned at the other end of said path to withdraw amplified signal energy from the device.

6. A wave amplifying device in accordance with claim 5 in which at least one of said coupling means comprises a dielectric lens focused on at least one of said resonators.

7. A wave amplifying device in accordance with claim 5 in which said first-mentioned coupling means comprises a first dielectric lens positioned to focus an incident beam of electromagnetic signal waves on at least one of said resonators at one end of said path and said last-mentioned coupling means comprises a second dielectric lens positioned to radiate electromagnetic signal energy from at least one of said resonators at the other end of said path.

8. A microwave device which comprises an elongated hollow enclosure of conducting material, electrode means positioned at one end of said enclosure to direct a stream of electrons lengthwise therethrough, a succession of equally spaced resonators positioned along the electron path consisting substantially of conducting material confined substantially to a single plane extending lengthwise along the electron path, and coupling means to withdraw electromagnetic wave energy from the device.

9. A microwave device in accordance with claim 8 in which said coupling means comprises a dielectric lens positioned to radiate electromagnetic wave energy from at least one of said resonators.

10. A high frequency wave amplifying device which comprises means defining a path of travel for electrons, an electron gun positioned at one end of said path to direct an electron stream along it, a flat conducting sheet disposed lengthwise along said path adjacent to the electron stream, said sheet having a succession of resonant apertures spaced along its length and having, relative to the cross-section of the electron stream, a substantially negligible extent in the direction perpendicular to the plane of said sheet, means positioned at one end of said path to supply signal energy to the device, and means positioned at the other end of said path to withdraw amplified signal energy from the device.

11. A high frequency wave amplifying device which comprises an elongated hollow wave guide, an electron-emissive cathode positioned at one end of said wave guide to direct an electron stream through said guide, a flat conducting sheet disposed lengthwise within said wave guide adjacent to the path of the electron stream, said sheet having at least one edge conductively connected to said wave guide, a succession of resonant apertures spaced along its length, and, relative to the cross-section of said wave guide, a substantially negligible extent in the direction perpendicular to the plane of said sheet, means positioned at the cathode end of said wave guide to supply signal energy to said guide, and means positioned at the other end of said wave guide to withdraw amplified signal energy from said guide.

12. An amplifying space discharge device operative over a predetermined band of signal frequencies which comprises an elongated hollow wave guide, an electron gun positioned at one end of said wave guide to direct an electron stream through said guide, a succession of flat conducting strips each substantially a quarter of a mid-band signal wavelength long spaced within said wave guide adjacent to the path of the electron stream with their quarter-wavelength dimensions transverse to and their broad faces substantially parallel to the electron stream, one end of each of said strips being conductively connected to said wave guide so that the connected ends form substantially a straight line extending for most of the length of the guide and each of said strips having, relative to the cross-section of said wave guide, a substantially negligible extent in the direction perpendicular to the plane of the strip, means situated at the gun end of said wave guide to supply signal energy to said guide, and means situated at the other end of said wave guide to abstract amplified signal energy from said guide.

13. An amplifying space discharge device in accordance with claim 12 in which the length of each of said strips in the direction of the electron stream is at most half of an electronic wavelength.

14. A high frequency wave amplifying device which comprises an elongated hollow wave guide, an electron gun positioned at one end of said wave guide to direct an electron stream through said guide, a flat conducting sheet disposed lengthwise within said wave guide adjacent to the path of the electron stream, said sheet having its opposite edges conductively connected to said wave guide, a succession of resonant apertures spaced along its length, and having, relative to the cross-section of said wave guide, a substantially negligible extent in the direction perpendicular to the plane of said sheet, means positioned at one end of said wave guide to impart signal energy to said guide, and means positioned at the other end of said wave guide to withdraw amplified signal energy from said guide.

15. A high frequency wave amplifying device in accordance with claim 14 in which said resonant apertures are substantially dumb-bell shaped.

16. A high frequency wave amplifying device which comprises means defining a path of travel for electrons, an electron gun positioned at one end of said path to direct an electron stream along it, a succession of resonators positioned along said path adjacent to the electron stream, each of said resonators being a conductive body and having, relative to the cross-section of the electron stream, a substantially negligible extent in at least one direction perpendicular to the electron stream, a first dielectric lens positioned to focus an incident beam of electromagnetic signal waves on at least one of said resonators at the gun end of said path, and a second dielectric lens positioned to radiate electromagnetic signal energy from at least one of said resonators at the other end of said path.

17. A microwave amplifying device which comprises means defining a path of travel for electrons, an electron gun positioned at one end of said path to direct an electron stream along it, a succession of resonators positioned which along said path, each of said resonators being a conductive body and having, relative to the cross-section of the electron stream, a substantially negligible conductive area perpendicular to the electron stream, a dielectric lens positioned to form an incident beam of electromagnetic signal waves on at least one resonator at the upstream end of said path, and a dielectric lens positioned to radiate electromagnetic signal energy from at least one resonator at the downstream end of said path.

18. An amplifying space discharge device which comprises means defining a path of travel for electrons, an electron gun positioned at one end of said path to direct an electron stream along it, signal input means positioned at the gun end of said path to supply a signal wave which is to be amplified to the device, signal output means positioned at the other end of said path to withdraw amplified signal energy from the device, and an electromagnetic wave transmission filter including a succession of resonators disposed along said path, each of said resonators being a conductive body and having, relative to the cross-section of the electron stream, a substantially negligible area perpendicular to the electron stream and said filter having signal frequency attenuation disposed along part of its length, the distance from said signal input means to the first substantial attenuation of said filter being substantially that specified by the term N in the relation CN=.2, where C is a parameter representing gain per per unit length along said filter and N is length along said filter in electronic wavelengths.

19. A microwave amplifying device which comprises an elongated hollow enclosure of conducting material, an electron emissive cathode positioned at one end of said enclosure to direct a stream of electrons lengthwise therethrough, a multiplicity of resonators in the form of a substantially coplanar succession of parallel conducting wires in an array extending along the electron path over a major portion of the length of said enclosure with substantially equal spacing between adjacent wires, each of said wires extending across the electron path and having at least one end secured to a common interior surface of said enclosure, input coupling means positioned at one end of said enclosure to supply a signal wave which is to be amplified to the device, and output coupling means positioned at the other end of said enclosure to withdraw amplified signal wave energy from the device.

20. A microwave amplifying device which comprises an elongated hollow enclosure of conducting material, an electron emissive cathode positioned at one end of said enclosure to direct a stream of electrons lengthwise therethrough, a substantially coplanar succession of parallel conducting wires in an array extending along the electron path over a major portion of the length of said enclosure with substantially equal spacing between adjacent wires, each of said wires extending substantially perpendicularly across the electron path and having one end only secured to a common interior surface of said enclosure, input coupling means positioned at the cathode end of said enclosure to supply a signal wave which is to be amplified to the device, and output coupling means positioned at the other end of said enclosure to withdraw amplified signal wave energy from the device.

21. A microwave amplifying device which comprises an elongated hollow enclosure of conducting material, an electron emissive cathode positioned at one end of said enclosure to direct a stream of electrons lengthwise therethrough, a multiplicity of resonators in the form of a substantially coplanar succession of parallel conducting wires in an array extending along the electron path over a major portion of the length of said enclosure with substantially equal spacing between adjacent wires, each of said wires extending perpendicularly across the electron path and having both ends secured conductively to opposite interior surfaces of said enclosure, input coupling means positioned at the cathode end of said enclosure to supply a signal wave which is to be amplified to the device, and output coupling means positioned at the other end of said enclosure to withdraw amplified signal wave energy from the device.

22. A microwave amplifying device having a predetermined signal frequency operating band which comprises an elongated hollow enclosure of conducting material, an electron emissive cathode positioned at one end of said enclosure to direct a stream of electrons therethrough, a substantially coplanar succession of parallel conducting wires in an array extending along the electron path over a major portion of the length of said enclosure with substantially equal spacing between adjacent wires, each of said wires extending substantially perpendicularly across the electron path, being substantially a quarter of a mid-band signal wavelength long, and having one end only secured conductively to a common interior surface of said enclosure, input coupling means positioned at the cathode end of said enclosure to supply a signal wave which is to be amplified to the device, and output coupling means positioned at the other end of said enclosure to withdraw amplified signal wave energy from the device.

23. A microwave amplifying device in accordance with claim 22 in which the wires at at least one end of the array are of gradually decreasing length as the end of the array is approached.

24. A microwave amplifying device in accordance with claim 22 in which the wires at both ends of the array are of gradually decreasing length as the respective end of the array is approached.

25. A microwave amplifying device operative over a predetermined band of signal frequencies which comprises an elongated hollow enclosure of conducting material, an electron emissive cathode positioned at one end of said enclosure to direct a stream of electrons therethrough, a multiplicity of resonators in the form of a substantially coplanar succession of parallel conducting wires in an array extending along the electron path over a major portion of the length of said enclosure with substantially equal spacing between adjacent wires, each of said wires extending substantially perpendicularly across the electron path, being substantially a half of a mid-band signal wavelength long, and having both ends secured conductively to opposite interior surfaces of said enclosure, input coupling means positioned at the cathode end of said enclosure to supply a signal wave which is to be amplified to the device, and output coupling means positioned at the other end of said enclosure to withdraw amplified signal wave energy from the device.

26. A microwave amplifying device which comprises an elongated hollow wave guide, an electron emissive cathode positioned at one end of said wave guide to direct a stream of electrons lengthwise therethrough, a succession of resonators in an array extending along the electron path over a major portion of the length of said wave guide, and means to join a hollow signal input wave guide to said elongated wave guide at the upstream end thereof in tandem transmission relation with said elongated wave guide and forming substantially a collinear continuation thereof to guide signal waves into said elongated wave guide past said cathode.

27. A microwave amplifying device which comprises an elongated hollow wave guide, an electron emissive cathode positioned at one end of said wave guide to direct a stream of electrons lengthwise therethrough, a collector electrode positioned at the other end of said wave guide, a succession of resonators in an array extending along the electron path over a major portion of the length of said wave guide, and means to join a hollow signal output wave guide to said elongated wave guide at the downstream end thereof in tandem transmission relation with said elongated wave guide and forming substantially a collinear continuation thereof to guide amplified signal waves out of said elongated wave guide past said collector electrode.

28. A microwave amplifying device which comprises an elongated hollow wave guide, an electron emissive cathode positioned at one end of said wave guide to direct a stream of electrons lengthwise therethrough, a collector electrode positioned at the other end of said wave guide, a succession of resonators in an array extending along the electron path over a major portion of the length of said wave guide, means to join a hollow signal input wave guide to said elongated wave guide at the cathode end thereof in tandem transmission relation with said elongated wave guide and forming substantially a collinear continuation thereof to guide signal waves into said elongated wave guide past said cathode, and means to join a hollow signal output wave guide to said elongated wave guide at the other end thereof in tandem transmission relation with said elongated wave guide and forming substantially a collinear continuation thereof to guide amplified signal waves out of said elongated wave guide past said collector electrode.

References Cited in the file of this patent

UNITED STATES PATENTS

| | | |
|---|---|---|
| Re. 22,990 | Hansen et al. | Mar. 23, 1948 |
| 2,122,538 | Potter | July 5, 1938 |
| 2,190,511 | Cage | Feb. 13, 1940 |
| 2,197,338 | Fritz | Apr. 16, 1940 |
| 2,280,824 | Hansen et al. | Apr. 28, 1942 |
| 2,438,119 | Fox | Mar. 23, 1948 |
| 2,516,944 | Barnett | Aug. 1, 1950 |
| 2,615,141 | Hansell | Oct. 21, 1952 |

FOREIGN PATENTS

| | | |
|---|---|---|
| 890,924 | France | Feb. 22, 1944 |